(12) United States Patent
Nogle

(10) Patent No.: US 6,408,718 B1
(45) Date of Patent: Jun. 25, 2002

(54) STAMPED PUMP COVER

(75) Inventor: Thomas D. Nogle, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/282,376

(22) Filed: Mar. 31, 1999

(51) Int. Cl.[7] ............................................. F16H 57/02
(52) U.S. Cl. ..................................................... 74/606 R
(58) Field of Search ........................ 74/606 R; 60/339, 60/330, 358; 418/170

(56) References Cited

U.S. PATENT DOCUMENTS

| | | |
|---|---|---|
| 3,618,711 A | 11/1971 | Vollmer |
| 3,667,228 A | 6/1972 | Ohie et al. |
| 3,724,598 A | 4/1973 | Smith |
| 4,231,266 A | 11/1980 | Nishikawa et al. |
| 4,368,802 A | 1/1983 | Grabill et al. |
| 4,437,358 A | 3/1984 | Kubo et al. |
| 4,644,815 A | 2/1987 | Kawano et al. |
| 4,713,980 A | 12/1987 | Ida et al. |
| 4,738,152 A | 4/1988 | Takimura et al. |
| 4,875,391 A | 10/1989 | Leising et al. |
| 4,899,851 A | 2/1990 | Falzoni et al. |
| 4,951,467 A * | 8/1990 | Walsh et al. ............... 74/606 R |
| 5,152,190 A * | 10/1992 | Jurgens et al. ............ 74/606 R |
| 5,158,152 A | 10/1992 | Nemoto et al. |
| 5,222,418 A | 6/1993 | Murota |
| 5,411,116 A | 5/1995 | Kish et al. |
| 5,474,428 A | 12/1995 | Kimura et al. |
| 5,483,850 A * | 1/1996 | Yamauchi .................. 74/606 R |
| 5,544,540 A | 8/1996 | Holman |
| 5,643,025 A | 7/1997 | Suzuki |
| 5,775,177 A * | 7/1998 | Ikeda ........................ 74/606 R |
| 5,852,931 A | 12/1998 | Reichenmiller et al. |
| 5,960,675 A * | 10/1999 | Murota ...................... 74/606 R |

* cited by examiner

Primary Examiner—Chong H. Kim
(74) Attorney, Agent, or Firm—Ralph E. Smith

(57) ABSTRACT

A pump cover for use in a transmission of a vehicle, wherein the transmission includes a transmission housing and a fluid pump disposed within the transmission housing. The fluid pump includes a pump housing defining an outer recess. Similarly, the transmission housing defines an inner recess. The pump cover comprises a generally circular plate having a centrally disposed aperture. The generally circular plate defines an outer portion and an inner portion. The outer portion of the generally circular plate is adapted to engage the inner recess of the transmission housing. Likewise, the inner portion of the generally circular plate is adapted to engage the outer recess of the pump housing. Thus, the generally circular plate cooperates with the transmission housing and the pump housing to enclose and seal a fluid volume adjacent the fluid pump, thereby minimizing the need for fluid seals within the fluid pump.

3 Claims, 2 Drawing Sheets

STAMPED PUMP COVER

FIELD OF THE INVENTION

The present invention relates to an automatic transmission for a vehicle and, more particularly, to a stamped pump cover for a fluid pump disposed within an automatic transmission.

BACKGROUND OF THE INVENTION

As is well known, motor vehicles typically include three basic components to effect movement of the vehicle—an engine, a transmission, and at least a pair of driven wheels. The function of the transmission is to transmit the mechanical energy produced by the engine to the driven wheels. More specifically, engine torque and speed are converted in the transmission in accordance with the tractive power demands of the vehicle.

Generally, a conventional automatic transmission includes a torque converter (as described above); fluid pressure-operated multi-plate drive or brake clutches; one-way clutches in conjunction with the frictional units; transmission controls, such as valves for applying and releasing elements to shift the gears (instant of shifting); and a transmission fluid pump for circulating transmission fluid to the various assemblies of the transmission. An example of an automatic transmission may be found in commonly-assigned U.S. Pat. No. 4,875,391, entitled "Electronically-Controlled, Adaptive Automatic Transmission System," issued on Oct. 24, 1989 to Leising et al. This patent is hereby incorporated by reference.

Transmission fluid pumps typically include an outer gear with internal teeth that operates within a bore of a pump housing. An inner gear having external teeth, cooperative with the teeth of the outer gear, is disposed within the outer gear. These pumps typically include large, machined plates having means for securing the inner and outer gears. It is typically necessary to maintain tight tolerances in the prior art design to insure the pump remains leak-proof. Moreover, a plurality of seals are commonly used between various members and fasteners to maintain this leak-proof condition in the pump.

However, more recently, with the popularity of sport-utility (SUV) and offroad vehicles, there is a need in the relevant art to provide an ever-smaller vehicle transmission capable of minimizing vehicle weight, cost, and NVH (noise, vibration, and harshness), yet capable of maximizing durability and life of the transmission.

SUMMARY OF THE INVENTION

In accordance with the broad teachings of this invention, a pump cover for use in a transmission of a vehicle having an advantageous construction is provided. The transmission of the vehicle includes a transmission housing and a fluid pump disposed within the transmission housing. The fluid pump includes a pump housing defining an outer recess. Similarly, the transmission housing defines an inner recess. The pump cover comprises a generally circular plate having a centrally disposed aperture. The generally circular plate defines an outer portion and an inner portion. The outer portion of the generally circular plate is adapted to engage the inner recess of the transmission housing. Likewise, the inner portion of the generally circular plate is adapted to engage the outer recess of the pump housing. Thus, the generally circular plate cooperates with the transmission housing and the pump housing to enclose and seal a fluid volume adjacent the fluid pump, thereby minimizing the need for fluid seals within the fluid pump.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
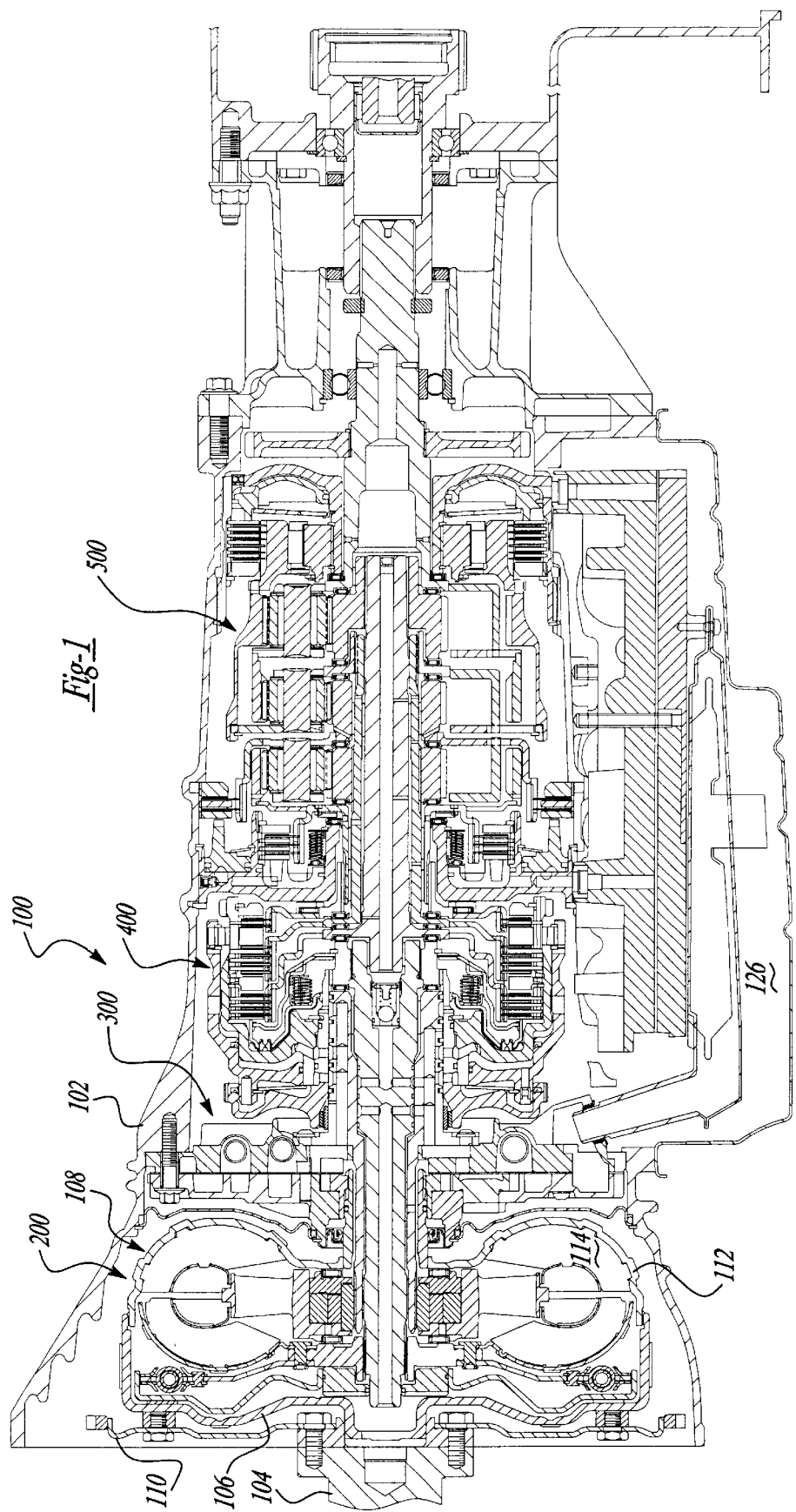
FIG. 1 is a cross-sectional view of an automatic transmission constructed in accordance with the teachings of the present invention.

The following description of the preferred embodiment is merely exemplary in nature and is in no way intended to limit the invention, its application, or uses.

Referring to the drawings, an automatic transmission 100 is shown according to the teachings of the present invention. Transmission 100 is adapted to be used in a vehicle (not shown), such as an automobile. However, it should be appreciated that the principles of the present invention may be employed in other types of vehicles and devices. Transmission 100 includes a transmission housing or case 102 for enclosing the numerous subassemblies that make up the transmission 100, including a torque converter assembly 200, a pump assembly 300, a multi-clutch assembly 400, and a gear assembly 500.

Torque converter assembly 200 is operative to transmit power from a rotating crankshaft 104 of an engine (not shown) to gear assembly 500. Power is transmitted from the rotating crankshaft 104 of the engine to a front cover member 106 of an impeller assembly 108 through a rotatable plate member 110. Impeller assembly 108 includes an impeller shell 112 having impeller blades 114 fluidly driven in a known manner to transmit power. An impeller hub 116 is fixedly secured to impeller shell 112 to rotate therewith.

Figure 2:
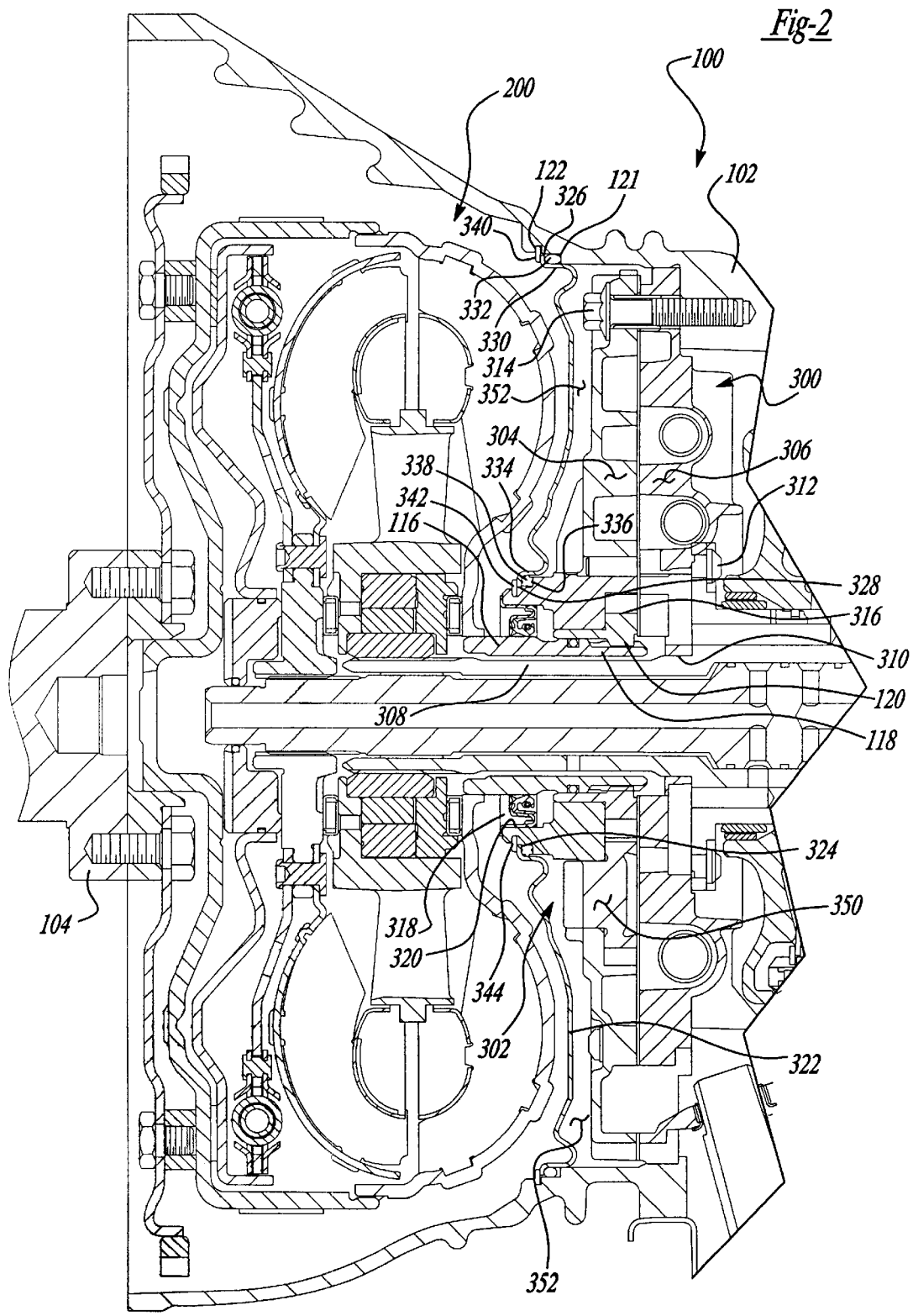
FIG. 2 is a partial cross-sectional view of the automatic transmission shown in FIG. 1.

Referring now to FIG. 2, pump assembly 300 includes a dual-stage, three-gear displacement pump 302 having a pump housing 304 and a reaction shaft support 306. Reaction shaft support 306 is secured, such as by press-fit, with a reaction shaft 308 at 310. Reaction shaft support 306 is further secured proximate its inner periphery to pump housing 304 by suitable fastening means such as bolts 312. Pump housing 304 and reaction shaft support 306 are likewise secured proximate their outer periphery to transmission housing 102 by suitable fastening means such as bolts 314.

Impeller hub 116 includes a neck portion 118 for drivingly engaging three-gear displacement pump 302. Impeller hub 116 is secured, such as by a spline connection at 120, to a central pump gear 316. Central pump gear 316 and impeller hub 116 are rotatably supported in pump housing 304. A seal ring assembly 318 is disposed about impeller hub 116 in a bore 320 at one end of pump housing 304 to prevent fluid from exiting the end of pump housing 304.

Pump assembly 300 further includes a cover plate 322 to prevent fluid from exiting pump assembly 300. Cover plate 322 is a generally circular member having a centrally disposed aperture 324. Specifically, cover plate 322 generally defines an outer portion 326 and an inner portion 328, and is preferably made of stamp-formed aluminum.

Outer portion 326 of cover plate 322 is generally L-shaped in cross-section. Specifically, outer portion 326 includes an outwardly-biased portion 330 generally parallel to a recessed portion 121 formed in transmission housing 102. Recessed portion 121 of transmission housing 102 is adapted to receive a sealing member 332, such as an O-ring. Outwardly-biased portion 330 of cover plate 322 thus contacts and seals against O-ring 332 to create a fluid seal between cover plate 322 and transmission housing 102, thereby preventing transmission fluid from existing pump assembly 300.

Similarly, inner portion 328 of cover plate 322 is generally L-shaped in cross-section. Specifically, inner portion 328 includes an outwardly-biased portion 334 generally parallel to a recessed portion 336 formed in pump housing 304. Recessed portion 336 of pump housing 304 is adapted to receive a sealing member 338, such as an O-ring. Outwardly-biased portion 334 of cover plate 322 thus contacts and seals against O-ring 338 to create a fluid seal between cover plate 322 and pump housing 304, thereby preventing transmission fluid from exiting pump assembly 300.

Pump assembly 300 further includes an outer retaining ring 340 and an inner retaining ring 342. Outer retaining ring 340 is generally circular in shape and is disposed within a channel 122 formed in transmission housing 102. Channel 122 is adjacent outer portion 326 of cover plate 322 to retain cover plate 322 in sealing engagement with O-ring 332. Likewise, inner retaining ring 342 is generally circular in shape and is disposed within a channel 344 formed in pump housing 304. Channel 344 is adjacent inner portion 328 of cover plate 322 to retaining cover plate 322 in sealing engagement with O-ring 338. It should be appreciated that outer retaining ring 340 and inner retaining ring 342 are used primarily to insure proper positioning of cover plate 322 during various pressure-testing procedures used during assembly.

During operation, pump assembly 300 generally pumps transmission fluid (not shown) to the various assemblies of the transmission 100. In particular, central pump gear 316 of pump assembly 300 cooperates with a pair of outer gears 350 (only one shown) to create a gear pump effect, thereby applying a force to the transmission fluid to establish fluid flow. However, the force being applied to the transmission fluid may cause transmission fluid to leak in various locations, such as between pump housing 304 and reaction shaft support 306 and around the rotating hubs of gears 350 in housing 304. Consequently, cover plate 322 cooperates with transmission housing 102 and pump housing 304 to define a leakage volume 352 for containing transmission fluid. Leakage volume 352 is fluidly coupled to a sump 126 to enable the transmission fluid to return to circulation.

The pump cover plate 322 of the present invention thus enables a simplified pump assembly to be used, which reduces the axial length of the transmission assembly. That is, by minimizing the need to individually seal each member of the pump assembly, a smaller, lightweight, die cast pump; pump valve body; and pump transfer plates may be used without the fear of external fluid leakage. Furthermore, unsealed threaded fasteners may be used to further reduce the complexity and cost of the transmission assembly. Still further, the pump cover plate of the present invention provides improved fluid drain paths and improved case venting by providing a large quiescent zone for oil separation.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A pump cover for use in a transmission of a vehicle, the transmission having a transmission housing and a fluid pump disposed within the transmission housing, the fluid pump having a pump housing defining an outer recess, the transmission housing defining an inner recess, said pump cover comprising:

a generally circular plate having a centrally disposed aperture, said generally circular plate defining an outer portion and an inner portion, said outer portion of said generally circular plate adapted to engage the inner recess of the transmission housing, said inner portion of said generally circular plate adapted to engage the outer recess of the pump housing, wherein said generally circular plate is adapted to cooperate with the transmission housing and the pump housing to enclose and seal a fluid volume adjacent the fluid pump, thereby minimizing the need for fluid seals within the fluid pump;

an outwardly-turned L-shaped portion extending from said outer portion of said generally circular plate;

an inwardly-turned L-shaped portion extending from said inner portion of said generally circular plate;

an outer sealing member adapted to be disposed between said outwardly-turned L-shaped portion of said outer portion and the transmission housing within said inner recess, said outer sealing member adapted to provide a fluid seal between the transmission housing and said generally circular plate;

an inner sealing member adapted to be disposed between said inwardly-turned L-shaped portion of said inner portion and the pump housing within said outer recess, said inner sealing member adapted to provide a fluid seal between the pump housing and said generally circular plate;

an outer retaining ring adapted to engage said outer portion of said generally circular plate and an inner channel of the transmission housing, said outer retaining ring preventing said generally circular plate from disengaging from the transmission housing; and an inner retaining ring adapted to engage said inner portion of said generally circular plate and an outer channel of the pump housing, said inner retaining ring preventing said generally circular plate from disengaging from the pump housing.

2. The pump cover according to claim 1 wherein said generally circular plate is stamp-formed aluminum.

3. A pump cover for use in a transmission of a vehicle, the transmission having a transmission housing and a fluid pump disposed within the transmission housing, the fluid pump having a pump housing defining an outer recess, the transmission housing defining an inner recess, said pump cover comprising:

a generally circular plate having a generally centrally disposed aperture, said generally circular plate defining an outer portion and an inner portion, said outer portion of said generally circular plate adapted to engage the inner recess of the transmission housing, said inner portions of said generally circular plate adapted to engage the outer recess of the pump housing;

an outer retaining ring adapted to engage said outer portion of said generally circular plate and an inner channel of the transmission housing, said outer retaining ring preventing said generally circular plate from disengaging from the transmission housing;

an inner retaining ring adapted to engage said inner portion of said generally circular plate and an outer channel of the pump housing, said inner retaining ring preventing said generally circular plate from disengaging from the pump housing, an outwardly-turned L-shaped portion extending from said outer portion of said generally circular plate;

an inwardly-turned L-shaped portion extending from said inner portion of said generally circular plate;

an outer sealing member adapted to be disposed between said outwardly-turned L-shaped portion of said outer portion and the transmission housing within said inner recess, said outer sealing member adapted to provide a fluid seal between the transmission housing and said generally circular plate; and an inner sealing member adapted to be disposed between said inwardly-turned L-shaped portion of said inner portion and the pump housing within said outer recess, said inner sealing member adapted to provide a fluid seal between the pump housing and said generally circular plate.

* * * * *